May 8, 1923.
W. H. THORPE
STORAGE BATTERY
Filed Aug. 22, 1921
1,454,571
Fig. 1
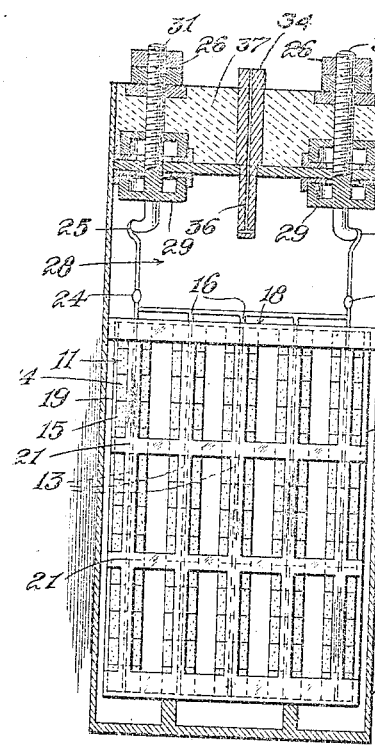
Fig. 2
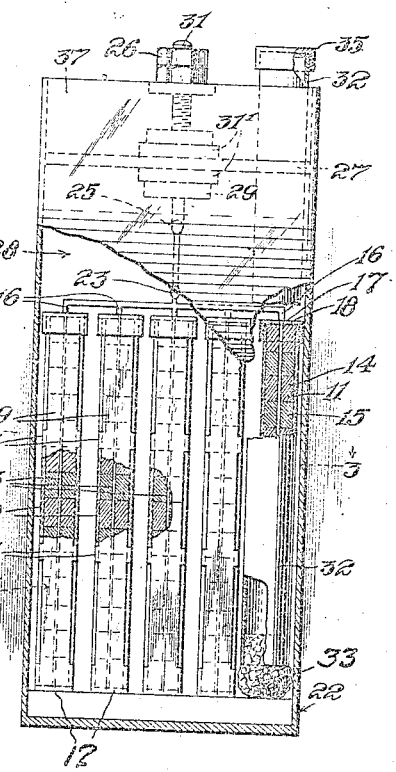
Fig. 3
INVENTOR
WILLIAM H. THORPE,
BY
ATTORNEY Patented May 8, 1923.

1,454,571

UNITED STATES PATENT OFFICE.

WILLIAM H. THORPE, OF MOUNT VERNON, NEW YORK.

STORAGE BATTERY.

Application filed August 22, 1921. Serial No. 494,221.

*To all whom it may concern:*

Be it known that I, WILLIAM H. THORPE, a citizen of the United States, residing at Mt. Vernon, New York, have invented certain new and useful Improvements in Storage Batteries, of which the following is a specification.

This invention relates to small storage batteries and its object is to provide a comparatively inexpensive storage battery suitable for delivering small current outputs but having a large ampere-hour capacity for a given weight of active material, a minimum amount of local action and a reasonable length of life, that is, cycles of charge and discharge, and a minimum amount of deterioration while standing idle. Also included in this invention is an improved method of filling the battery with water or electrolyte and an improved method for the prevention of terminal corrosion.

I have herein described one embodiment of my invention which is the best of which I am at present advised but this embodiment is used in an illustrative sense and not a limiting one for obviously many embodiments can be devised which will be within the spirit and scope of the invention.

The chosen embodiment has been illustrated in the accompanying drawings in which—

Figure 1 is a vertical section taken through my improved battery;

Figure 2 is an elevation of my battery with a part cut away to show the interior construction and especially the filling tube;

Figure 3 is a horizontal sectional view taken along the lines 3—3 in Fig. 1.

The invention resolves itself into component parts or features which may be referred to as units, plates, complete cell, terminals, filling tubes, and vent and sealing. Therefore, a description will be given under each of these headings as follows:

*Units.*—The plates 11 of my invention are made up of a number of units 12, through the center of which a small strip or rod 13 (of lead or an alloy of antimony and lead) is used for conducting the current. This strip is of the minimum dimensions suitable for carrying the required current and it may be of any suitable shape, square, round, oblong and twisted, etc., a square strip, however, being shown in the drawing. The active material 14 for the positive and negative units may be made of the customary lead oxides of any shape such as in the form of a cube or flat disc, and is molded around the lead core strip 13. In between these cubes, or discs of active material, a porous, inactive material 15 is molded after the active material has set. The whole unit then takes the form shown in Fig. 2 with a cube or disc of active material alternating with a cube or disc of porous material and a lead rod running through the center of each. The purpose of the porous material 15, is to strengthen the unit and at the same time to allow the electrolyte to come in contact with the top and bottom surfaces of the active material cubes or discs, thus giving a maximum current capacity for a given weight of active material. This porous material may consist of a mixture of plaster of Paris and powdered pumice stone applied in the form of a wet paste which will afterwards set, or other equivalent material.

*Plates.*—The plates 11, both positive and negative, are made up of a number of these units 12 connected together at their tops by lead strips 16 (forming continuations of the core strips 13) which are burned together. Before connecting the units together to make the plate 12, the lead strip 13 of each unit is passed through the holes 17 in the plate holder cover 18. After the units are connected together to form the plate 11, they are placed in the plate holder 19. The plate holder 19 may be made of some insulating acid resisting material such as hard rubber. The uprights 20 of the plate holder and cross pieces 21 hold the units 12 of the plate 11 in place and prevent them from warping. The plate holder being of an insulating material, takes the place of the usual separator.

*Complete cell.*—Before the plate groups are placed in the jar or battery casing 22, the terminal lead strips of each group are lead-burned at 25 to the cell terminals 26. The plate groups are then placed in the jar, and the electrolyte added, this being in the form of a very wet paste which may consist of powdered pumice stone, plaster of Paris and sulphuric acid of about 1.250 sp. gr. or other equivalent material such as a solution of silicate of soda and sulphuric acid. After the electrolyte is poured into the jar, the space 28 provided between the top of the plates and the jar cover 27 may be filled with some inactive porous material such, for instance as sponge soft rubber, thus providing a suitable expansion space for the electrolyte and gas and also preventing the paste electrolyte from flowing away from the plates when the cell is placed on its side or turned upside down.

*Terminals.*—The terminals 26 are of special construction to prevent the electrolyte creeping up onto and corroding any brass or copper connections made to the cell. The terminal may be made of a lead-antimony alloy and is preferably constructed as shown. A cup part 29 is filled with an acid resisting material such as petroleum jelly or petroleum jelly combined with a strong alkali. The terminals are passed through holes in the jar cover 27 and a nut 30 is screwed down on the terminal screw 31 to meet the cover 27. The nut 30 is in the form of an inverted cup also filled with the acid resisting material similar to that used on the cup part 29. To make a tight fit and to keep the vaseline in place around the terminal, a soft rubber washer 31' is placed on the cups as shown. This method of sealing the terminals is not confined to this particular type of cell, but is applicable to any storage battery terminal. The screw part of the terminal may be made of brass or other equivalent material embedded in an antimony-lead cup where a stronger terminal is required. Suitable nuts are provided at the top of the terminal for making wire connections to the cell.

*Filling tube.*—A filling tube 32 is provided as shown in Fig. 2 which may be made of hard rubber, glass or other acid resisting material. In order to allow space in the cell for this tube, one unit is omitted in one of the end negative plates as shown in Fig. 3. The filling tube is raised a short distance above the bottom of the cell and the bottom of the tube is filled with a porous inactive material 33 similar to the material 28 above the plates in the expansion space. This is preferably sponge rubber. The material 33 enters the filling tube 32 a short distance and that portion thereof extending out of the tube is larger in diameter than the tube. One of the defects of the present "solid" acid storage batteries is that the paste electrolyte gradually dries out. By using a filling tube as above described, water may be added from time to time and it will gradually seep into the paste electrolyte to replace that lost by evaporation and gassing. As an obstruction is placed in the bottom of the tube (soft sponge rubber 33) it will take considerable time to seep through the bottom of the tube. This method therefore prevents too much water being added to fill up the expansion space and come out through the vent tube 34. The sponge rubber 33 at the bottom of the tube also prevents the paste electrolyte from filling the tube. The filling tube is provided with a suitable cap or plug 35.

*Vent and sealing.*—In order to allow any gas formed to escape from the cell, a small vent tube 34 is provided having a forked duct 36 therein to prevent the exit of any liquid. The space above the jar cover is then filled in up to the top of the jar with sealing compound 37. It will thus be seen that I have devised a new cell which has the following advantages:

As all faces of the active material are exposed to the action of the electrolyte, there is a minimum amount of active material used, thus cheapening the construction and cutting down the weight. Also, as the active material is in the form of small cubes or discs, the plate will warp very little.

As the lead strip through the center of the unit is of a minimum size to conduct the current required, the customary heavy grid is done away with, thus cutting down the weight of the plate, and also resulting in a minimum amount of local action between the metallic lead in the plate and the active material.

As the plate holder is made of an insulating, acid resisting material, no separators are required between the positive and negative plates.

As a large expansion space is provided above the plates wherein the sponge rubber will hold the solid part of the electrolyte in place, the electrolyte can contain more liquid than is usual in the case of storage cells of the solid acid type, thus increasing the ampere hour capacity of the cell.

As a filling tube is provided which automatically measures the amount of liquid added, too much liquid cannot be added, so there is never any leakage through the vent.

Acid creepage up the terminals is prevented.

As the plates are made up in the form of units, it will not be necessary for the manufacturer to keep various sizes of plates in stock because different sizes of plates can be made up quickly by assembling different numbers of units to make up the various sizes required. Therefore, the units only need be kept in stock.

What I claim is:

1. In a storage battery, a container, a container cover, a terminal, electrolyte, and means for preventing the electrolyte from creeping up said terminal comprising a cup-like element associated with said terminal, gasket means between said element and said container cover whereby a sealed chamber is formed, an acid resisting grease sealed in said chamber and means encircling said terminal for clamping said cup-like element against said gasket and container cover to maintain said chamber sealed.

2. In a storage battery, a container, a container cover, a terminal, electrolyte, and means for preventing the electrolyte from creeping up said terminal comprising opposed cup-like elements associated with said terminal, one on each side of said container cover, gasket means between each of said elements and the container cover, whereby two sealed chambers are formed around said terminal, and an acid resisting grease sealed in each of said chambers.

3. In combination with a battery terminal, two superposed grease-containing sealed chambers encircling said terminal.

4. In combination with a battery terminal, a battery container cover, and two superposed grease-containing sealed chambers encircling said terminal, said chambers having said cover therebetween.

In testimony whereof I have affixed my signature to this specification.

WILLIAM H. THORPE.